(12) United States Patent
Lipinski et al.

(10) Patent No.: US 10,151,217 B2
(45) Date of Patent: Dec. 11, 2018

(54) TURBINE FRAME COOLING SYSTEMS AND METHODS OF ASSEMBLY FOR USE IN A GAS TURBINE ENGINE

(71) Applicant: General Electric Company, Schenectady, NY (US)

(72) Inventors: Thomas Lipinski, Monroe, OH (US); Donald George LaChapelle, Cincinnati, OH (US); Kenneth Jay Moore, Hamilton, OH (US); Bradford Tracey, Cold Spring, KY (US); Stephen Joseph Waymeyer, Batavia, OH (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 15/041,524

(22) Filed: Feb. 11, 2016

(65) Prior Publication Data

US 2017/0234155 A1 Aug. 17, 2017

(51) Int. Cl.
| | |
|---|---|
| *F01D 25/14* | (2006.01) |
| *F01D 11/00* | (2006.01) |
| *F01D 17/08* | (2006.01) |
| *F01D 17/10* | (2006.01) |
| *F01D 17/14* | (2006.01) |
| *F01D 25/12* | (2006.01) |

(Continued)

(52) U.S. Cl.
CPC ............. *F01D 25/14* (2013.01); *F01D 9/065* (2013.01); *F01D 11/005* (2013.01);
(Continued)

(58) Field of Classification Search
CPC .... F01D 11/005; F01D 17/085; F01D 17/105; F01D 17/145; F01D 25/12; F01D 25/14;
(Continued)

(56) References Cited

U.S. PATENT DOCUMENTS

| | | | | |
|---|---|---|---|---|
| 4,069,661 A | * | 1/1978 | Rundell | F02K 3/075 60/204 |
| 4,072,008 A | * | 2/1978 | Kenworth | F02K 3/075 60/262 |

(Continued)

FOREIGN PATENT DOCUMENTS

GB 695482 A 8/1953

OTHER PUBLICATIONS

Extended European Search Report and Opinion issued in connection with corresponding EP Application No. 16202245.3 dated Jun. 13, 2017.

*Primary Examiner* — Igor Kershteyn
(74) *Attorney, Agent, or Firm* — General Electric Company; Pamela Kachur

(57) ABSTRACT

A turbine frame cooling system for use with a gas turbine engine includes an outer ring defining a cavity and a hub positioned radially inward of the outer ring. The turbine frame cooling system also includes a plurality of circumferentially-spaced first fairings coupled between the outer ring and the hub and a plurality of circumferentially-spaced second fairings coupled between the outer ring and the hub, wherein the first and second fairings are alternatingly positioned about the hub. The turbine frame cooling system also includes a plurality of circumferentially-spaced air scoops coupled to the outer ring. The plurality of air scoops extend into a bypass stream and are configured to channel a bypass air cooling flow into the cavity of the outer ring.

18 Claims, 3 Drawing Sheets

(51) Int. Cl.
  *F01D 25/24*  (2006.01)
  *F01D 9/06*  (2006.01)
  *F01D 25/16*  (2006.01)
  *F02C 7/12*  (2006.01)

(52) U.S. Cl.
  CPC ......... *F01D 17/085* (2013.01); *F01D 17/105* (2013.01); *F01D 17/145* (2013.01); *F01D 25/12* (2013.01); *F01D 25/145* (2013.01); *F01D 25/162* (2013.01); *F01D 25/24* (2013.01); *F02C 7/12* (2013.01); *F05D 2220/32* (2013.01); *F05D 2260/20* (2013.01); *Y02T 50/675* (2013.01)

(58) Field of Classification Search
  CPC ........ F01D 25/24; F01D 9/065; F01D 25/145; F01D 25/162; F05D 2220/32; F05D 2260/20; F02C 7/12; Y02T 50/675
  See application file for complete search history.

(56) References Cited

U.S. PATENT DOCUMENTS

| | | | |
|---|---|---|---|
| 4,086,761 A | 5/1978 | Schaut et al. | |
| 4,142,365 A | 3/1979 | Sargisson et al. | |
| 4,989,406 A | 2/1991 | Vdoviak et al. | |
| 5,076,062 A | 12/1991 | Abreu | |
| 5,184,459 A * | 2/1993 | McAndrews | F01D 17/162 415/149.2 |
| 5,404,713 A * | 4/1995 | Johnson | F02K 1/825 60/204 |
| 5,694,767 A | 12/1997 | Vdoviak et al. | |
| 8,092,153 B2 | 1/2012 | Strecker et al. | |
| 8,641,362 B1 | 2/2014 | Liang | |
| 8,863,531 B2 | 10/2014 | Scott et al. | |
| 9,108,737 B2 | 8/2015 | Zysman | |
| 9,157,325 B2 | 10/2015 | Suciu et al. | |
| 2005/0047942 A1* | 3/2005 | Grffin, III | F02K 3/072 417/423.1 |
| 2005/0109012 A1* | 5/2005 | Johnson | F02K 3/065 60/226.1 |
| 2006/0096272 A1* | 5/2006 | Baughman | F01D 5/022 60/232 |
| 2007/0186535 A1* | 8/2007 | Powell et al. | F02K 3/02 60/226.1 |
| 2012/0227375 A1 | 9/2012 | Badcock et al. | |
| 2015/0285095 A1 | 10/2015 | Yeager et al. | |
| 2015/0330250 A1 | 11/2015 | Scott et al. | |
| 2015/0345389 A1 | 12/2015 | Pisacreta | |
| 2015/0345425 A1 | 12/2015 | Roberge | |

* cited by examiner

TURBINE FRAME COOLING SYSTEMS AND METHODS OF ASSEMBLY FOR USE IN A GAS TURBINE ENGINE

STATEMENT REGARDING FEDERALLY SPONSORED RESEARCH AND DEVELOPMENT

This invention was made with Government support under contract number FA8650-09-D-2922 awarded by the United States Air Force. The Government has certain rights in this invention.

BACKGROUND

The application described herein relates generally to gas turbine engines, and more specifically to a turbine frame cooling systems for use in a gas turbine engine.

Gas turbine engines typically include an inlet, a fan, low and high pressure compressors, a combustor, and low and high pressure turbines. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of the frames that surround various engine components. Specifically, at least one known frame includes radial support struts which project across an annular flowpath to interconnect the inner and outer frame members. Since the temperature of the motive fluid flowing through the flowpath changes very rapidly during transient engine operation, substantial thermal stresses can be created in the rigid frame assemblies when the struts are allowed to heat up and cool down at rates differing substantially from those of the inner and outer frame members. This is particularly true with respect to the turbine frame assembly since the exhaust gases which surround the turbine frame assembly are subject to the most rapid and greatest changes in operating temperatures and resulting thermal stresses. At least some known cooling systems use compressor air or bore air to purge and cooling the frame to reduce the thermal gradients. However, the use of compressor air or bore flow may result in less efficient engine cycle.

BRIEF DESCRIPTION

In one aspect, a turbine frame cooling system for use with a gas turbine engine is provided. The turbine frame cooling system includes an outer ring defining a cavity and a hub positioned radially inward of the outer ring. The turbine frame cooling system also includes a plurality of circumferentially-spaced first fairings coupled between the outer ring and the hub and a plurality of circumferentially-spaced second fairings coupled between the outer ring and the hub, wherein the first and second fairings are alternatingly positioned about the hub. The turbine frame cooling system also includes a plurality of circumferentially-spaced air scoops coupled to the outer ring. The plurality of air scoops extend into a bypass stream and are configured to channel a bypass air cooling flow into the cavity of the outer ring.

In another aspect, a method of cooling a turbine frame of a gas turbine engine is provided. The method includes channeling a cooling flow from a bypass duct through a plurality of air scoops, wherein the plurality of air scoops are coupled to an outer ring of a frame and extend into the bypass duct. The method also includes channeling a first portion of the cooling flow through a plurality of first fairings that are coupled between the outer ring and an inner hub, and channeling a second portion of the cooling flow through a plurality of second fairings that are coupled between the outer ring and the inner hub. The plurality of first fairings are alternatingly positioned with the plurality of second fairings.

DETAILED DESCRIPTION

Figure 1:
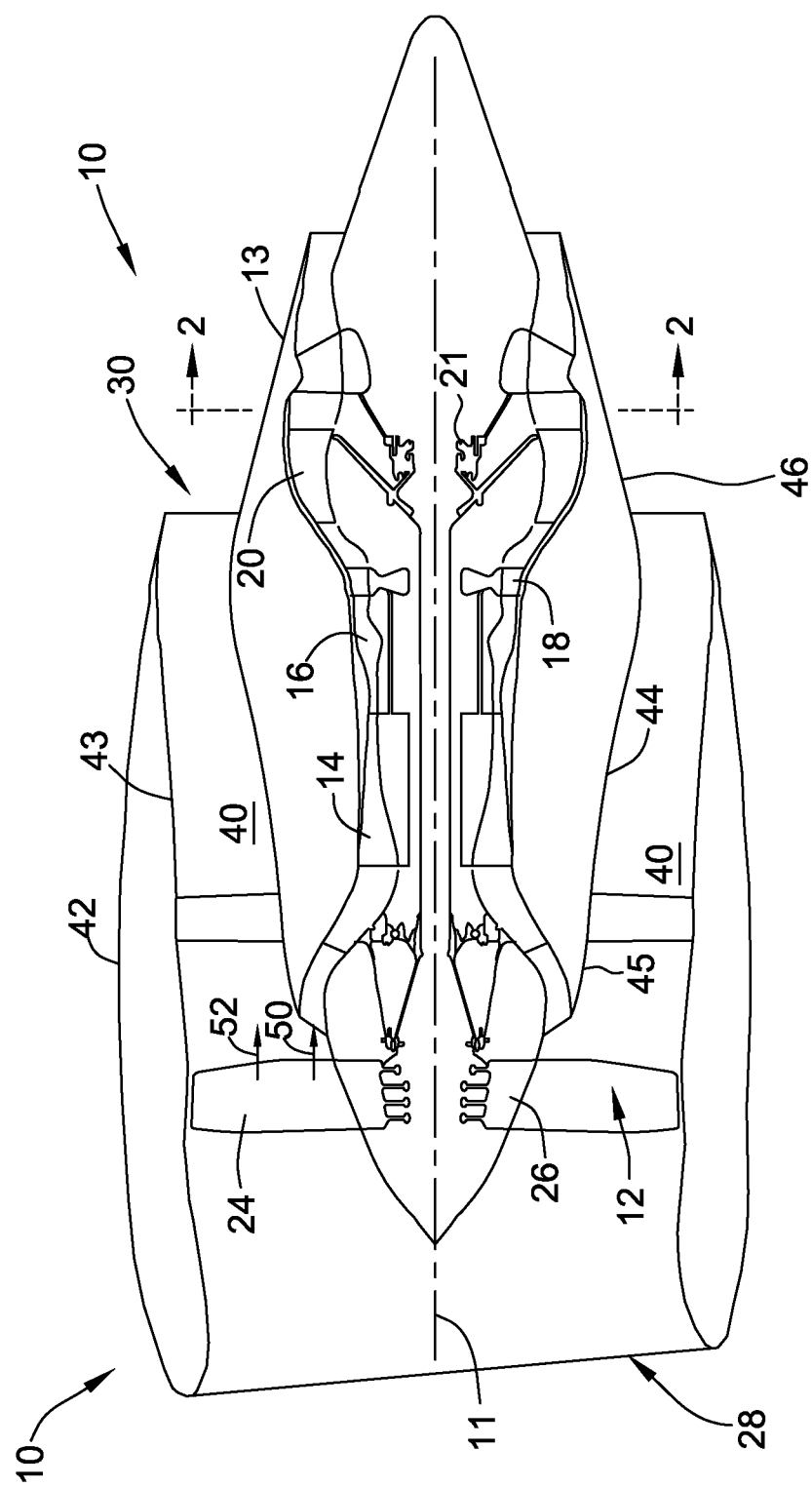
FIG. 1 is a schematic illustration of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The exemplary assemblies and methods described herein overcome at least some disadvantages of known systems and methods for cooling turbine frames in a gas turbine engine. Moreover, the systems and methods described herein include an outer ring defining a cavity and a hub positioned radially inward of the outer ring. The turbine frame cooling system also includes a plurality of circumferentially-spaced first fairings coupled between the outer ring and the hub and a plurality of circumferentially-spaced second fairings coupled between the outer ring and the hub, wherein the first and second fairings are alternatingly positioned about the hub. The turbine frame cooling system also includes a plurality of circumferentially-spaced air scoops coupled to the outer ring. The plurality of air scoops extend into a bypass stream and are configured to channel a bypass air cooling flow into the cavity of the outer ring.

A first portion of the cooling airflow is channeled radially inward through the first fairing along fluid lines housed therein. The metal walls of the fluid lines are cooled by the first portion and the temperature of the fluid lines is maintained to be lower than the coking temperature of the fluid therein. A second portion of the cooling airflow passes over the first fairing and travels circumferentially to heat the outer ring while simultaneously cooling the second fairing and strut housed therein to reduce the thermal gradient between the strut and the outer ring and, therefore, reduce the thermal stresses.

The use of bypass air simplifies the exterior and interior design of the engine and does not require any external pipes to move air from the compressor to the frame. By using bypass air, the hub design of the frame is simplified by not requiring features to meter the flow of air from inside the engine to the frame. The overall design is lighter and simpler than typical historic designs. Additionally, bypass air is typically cooler than convention air sources, such as the compressor, such that it cools more efficiently and also increased the operating efficiency of the engine by eliminating the need to capture compressor air from the primary flowpath.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "first", "second", and "third" may be used interchangeably to distinguish one component from another and are not intended to signify location or importance of the individual components.

As used herein, the terms "axial" and "axially" refer to directions and orientations that extends substantially parallel to a centerline of the turbine engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component. Moreover, the terms "radial" and "radially" refer to directions and orientations that extends substantially perpendicular to the centerline of the turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine 13 includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 1) that are utilized to provide rotational and axial support to fan assembly 12, compressor 14, high pressure turbine 18 and low pressure turbine 20, for example. To maintain the various components of engine 10 in their proper relative operating positions, various engine frame assemblies are provided for rigidly interconnecting the stationary components and for providing bearing supports for rotating components. More specifically, engine 10 includes a turbine frame 46 supporting an aft bearing 21.

In operation, air flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 43 of a fan casing or shroud 42 and an outer wall 45 of splitter 44.

Figure 2:
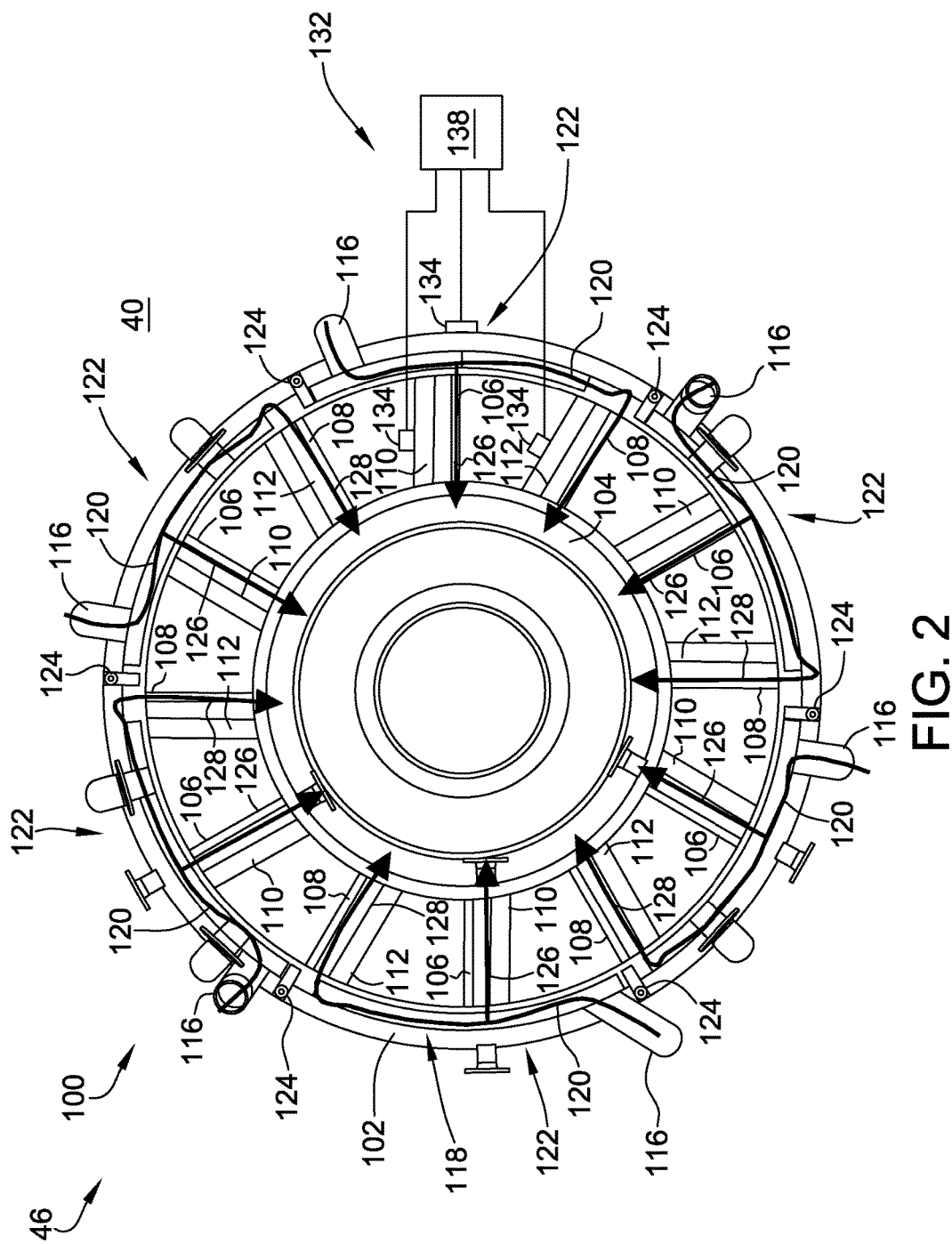
FIG. 2 is a front cross-sectional illustration of the gas turbine engine at location 2-2 shown in FIG. 1 illustrating an exemplary turbine frame cooling system.
Figure 3:
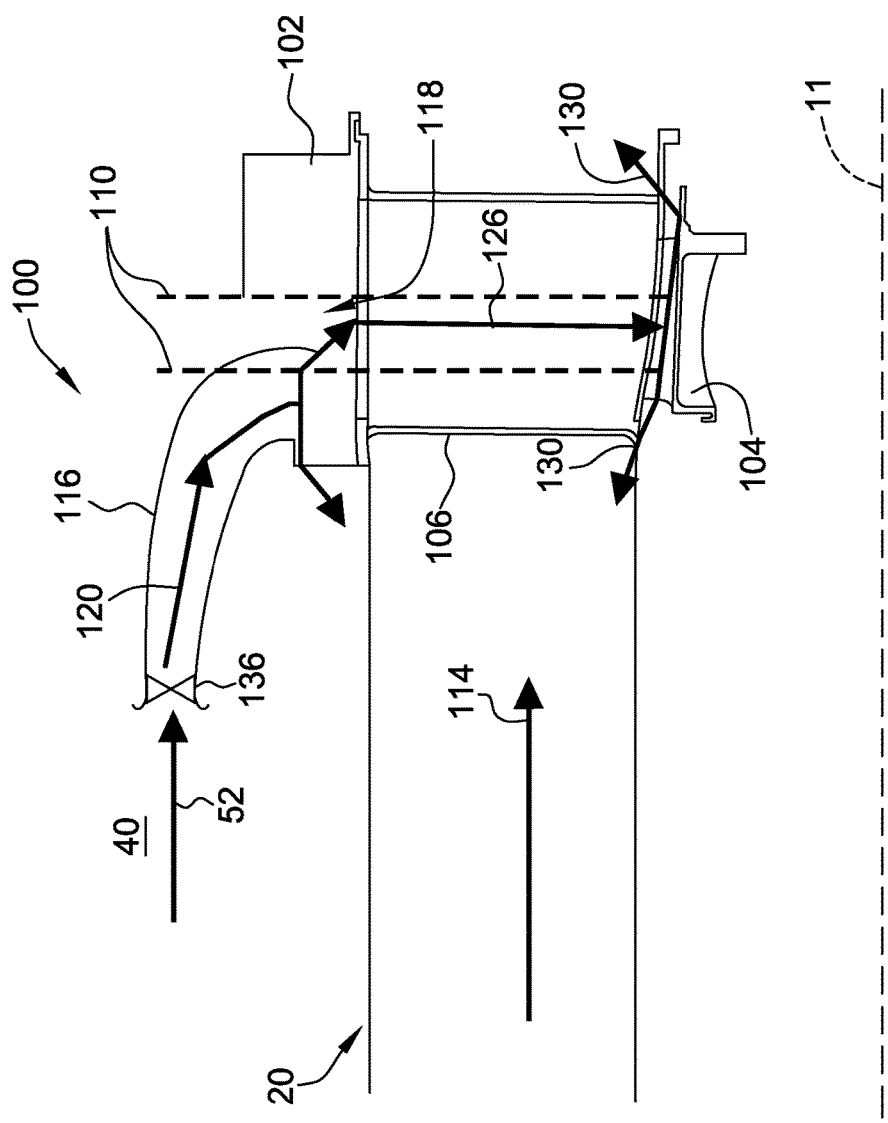
FIG. 3 is side cross-sectional view of the gas turbine engine illustrating the turbine frame cooling system.

FIG. 2 is a front cross-sectional illustration of gas turbine engine 10 at location 2-2 shown in FIG. 1 illustrating an exemplary turbine frame cooling system 100 for cooling turbine frame 46. FIG. 3 is side cross-sectional view of gas turbine engine 10 illustrating a portion of turbine frame cooling system 100. In the exemplary embodiment, turbine frame cooling system 100 includes an outer ring 102, an inner hub 104, a plurality of circumferentially-spaced first fairings 106, and a plurality of circumferentially-spaced second fairings 108. Each fairing 106 and 108 is coupled between inner hub 104 and outer ring 102. Furthermore, fairings 106 and 108 circumferentially alternate about the circumference of hub 104 such that each first fairing 106 is positioned between two adjacent second fairings 108.

In the exemplary embodiment, turbine frame cooling system 100 also includes a plurality of fluid service lines 110 and a plurality of support struts 112, both extending between inner hub 104 and outer ring 102. More specifically, fluid lines 110 extend through each first fairing 106 and facilitate channeling cooling or lubricating fluid between inner hub 104 and outer ring 102. Additionally, each second fairing 108 houses a strut 112 therein, which provides structural support to outer ring 102. In the exemplary embodiment, fairings 106 and 108 extend radially through a primary flowpath 114 (as shown in FIG. 3) and are exposed to high temperature combustion gases flowing axially through engine 10 during engine operation. As such, each fairing 106 and 108 is aligned with a direction of the combustion gases along flowpath 114 to minimize aerodynamic drag pressure losses and flowpath blockage. Furthermore, each fairing 106 and 108 is formed as a thin-sectioned, symmetrical or non-symmetrical, cambered or non-cambered airfoil surrounding either fluid lines 110 or supper strut 12. Alternatively, fairings 106 and 108 are oriented in any direction and include any shape that facilitates operation of turbine frame cooling system 100 as described herein.

As described above, struts 112 are exposed to large and frequent thermal gradient over various engine 10 operating temperatures. As such, substantial thermal stresses may be created in frame 46 if struts 112 are allowed to heat up and cool down at rates differing substantially from those of inner hub 106 and outer ring 102. Additionally, fluid lines 110 are generally formed from metal and absorb heat from the combustion gases in flowpath 114. Fluid lines 110 transport a fluid that, when heated above a certain temperature, may cause coking within fluid lines 110. Accordingly, in the exemplary embodiment, turbine frame cooling system 100 channels cooling air through fairings 106 and 108 to manage the thermal gradient of struts 112 and to maintain the temperature of fluid lines 110 below the coking temperature of the fluid within.

In the exemplary embodiment, turbine frame cooling system 100 includes a plurality of circumferentially-spaced air scoops 116 that are coupled to outer ring 102 and extend in bypass duct 40 from outer ring 102. Scoops 116 capture a portion of bypass air 52 from bypass stream 40 and channel bypass air 52 into a cavity 118 defined in outer ring 102 to act as a cooling airflow 120. Air scoops 116 facilitate channeling cooling airflow 120 into cavity 118 to purge and cool each of outer ring 102, fairings 106 and 108, fluid lines 110, struts 112, and inner hub 104. Although FIG. 2 shows six air scoops 116, outer ring 102 includes any number of air scoops 116 to facilitate operation of turbine frame cooling system 100 as described herein.

In the exemplary embodiment, turbine frame cooling system 100 also includes a plurality of independent cooling circuits 100. Each cooling circuit 122 includes one air scoop 116, one first fairing 106, and one second fairing 108. More specifically, air scoop 116 is positioned circumferentially upstream of both first and second fairings 106 and 108 in each circuit 122 such that each air scoop 116 is positioned between a second fairing 108 of an adjacent circuit 122 and the first fairing 106 in the same circuit 122 as air scoop 116. As such, turbine frame cooling system 100 includes the same number of each of air scoops 116, first fairings 106, and second fairings 108. Furthermore, each cooling circuit 122 includes a seal 124 coupled within cavity 118 of outer ring 102. Seals 124 act to divide separate adjacent cooling circuits 122 from one another and to divide cavity 118 into a plurality of cavity segments that are associated with a corresponding cooling circuit 122. Seals 124 limit the circumferential travel of cooling airflow 120 within cavity 118 and are positioned at a circumferential downstream end of each cooling circuit 122 between air scoop 116 of an adjacent cooling circuit 122 and second fairing 108 of the same circuit 122 as seal 124.

Each cooling circuit 122 operates in a substantially similar manner as every other cooling circuit 122. As such, only the operation of one cooling circuit 122 is described in detail herein. In operation, air scoop 116 captures bypass air 52 from bypass duct 40 and channels the bypass air 52 into cavity 118 of outer ring 102 as cooling airflow 120. Airflow 120 travels circumferentially within outer ring 102 and cools the portion of outer ring 102 between air scoop 116 and first fairing 106. Because the circumferential distance is relatively small, cooling airflow 120 increases only slightly in temperature.

A first portion 126 of cooling airflow 120 is then channeled radially inward through first fairing 106 along fluid lines 110 housed therein. The metal walls of fluid lines 110 are cooled by first portion 126 and the temperature of fluid lines 110 is maintained to be lower than the coking temperature of the fluid therein. First portion 126 is channeled radially inward through first fairing 106 before cooling air 120 can absorb much heat from flowpath 114 during the circumferential travel through outer ring 102.

A second portion 128 of cooling airflow 120 continues circumferentially about outer ring 102 absorbing heat from combustion gases within flowpath 114 as it travels such that second portion 128 of cooling airflow 120 is at a higher temperature than first portion 126. Second portion 128 is then channeled radially inward through second fairing 108 to cool second fairing 108 and strut 112 housed therein. As such, turbine cooling system 100 facilitates cooling both first fairing 106 and second fairing 108, but cools first fairing 106 more than second fairing 108. Any air that does not get channeled into second fairing 108 initially will be blocked from further circumferential travel by seal 124 and be forced radially inward through second fairing 108 by seal 124. As such, seals 124 allow for a set amount of heat to be absorbed by cooling airflow 120 as it travels within a corresponding circuit 122.

As second portion 128 travels circumferentially around outer ring 102, it gains heat and locally heats outer ring 102 before traveling radially through second fairing 108 to cool second fairing 108 and strut 112. Because second fairing 108 and strut 112 are positioned within primary flowpath 114, they generally operate at a significantly higher temperature than outer ring 102. This temperature difference causes the above-described large thermal gradients that lead to thermal stresses between outer ring 102 and second fairing 108. As such, second portion 128 heats outer ring 108 while simultaneously cooling second fairing 108 and strut 112 housed therein to reduce the thermal gradient between strut 112 and outer ring 102 and inner hub 104 and, therefore, reduce the thermal stresses.

Once first and second portions 126 and 128 are channeled through respective first and second fairings 106 and 108, the cooling air 120 from inner hub 104 into primary flowpath 114 either axially upstream downstream or axially upstream, or both, of fairings 106 and 108 as leakage airflow 130.

In the exemplary embodiment, turbine frame cooling system 100 also includes a control system 132 for controlling cooling airflow 120 entry into air scoops 116 of cooling circuits 122. Control system 132 includes a temperature sensor 134 coupled to any combination of first fairing 106, second fairing 108, and outer ring 102. Furthermore, control system 132 includes a valve 136 coupled to each air scoop 116 to control entry of bypass air 52 into cooling system 100. Sensors 134 and valves 136 are operatively coupled to a controller 138. Sensors 134 measure the temperature of first fairing 106, second fairing 108, or outer ring 102 and relay a signal representative of the measured temperature to controller 138. Controller 138 compares the measured temperature to a stored predetermined temperature and controls operation of valves 136 based on the comparison. Specifically, if the measured temperature is below the predetermined temperature, then cooling of first fairing 106, second fairing 108, and outer ring 102 may not be required, and valves 136 are actuated closed. Similarly, if the measured temperature is above the predetermined temperature, then cooling of first fairing 106, second fairing 108, and outer ring 102 is required, and valves 136 are actuated open. Although valves 136 are described herein as being coupled to each air scoop 116, in other embodiments, valves 136 are coupled to less than all air scoops 116. Alternatively, valves 136 are coupled to outer ring 102 circumferentially downstream of air scoop 116 in each circuit 122.

The exemplary assemblies and methods described herein overcome at least some disadvantages of known systems and methods for cooling turbine frames in a gas turbine engine. Moreover, the assemblies and methods described herein include an outer ring defining a cavity and a hub positioned radially inward of the outer ring. The turbine frame cooling system also includes a plurality of circumferentially-spaced first fairings coupled between the outer ring and the hub and a plurality of circumferentially-spaced second fairings coupled between the outer ring and the hub, wherein the first and second fairings are alternatingly positioned about the hub. The turbine frame cooling system also includes a plurality of circumferentially-spaced air scoops coupled to the outer ring. The plurality of air scoops extend into a bypass stream and are configured to channel a bypass air cooling flow into the cavity of the outer ring.

A first portion of the cooling airflow is then channeled radially inward through the first fairing along fluid lines housed therein. The metal walls of the fluid lines are cooled by the first portion and the temperature of the fluid lines is maintained to be lower than the coking temperature of the fluid therein. A second portion of the cooling airflow passes over the first fairing and travels circumferentially to heat the outer ring while simultaneously cooling the second fairing and strut housed therein to reduce the thermal gradient between the strut and the outer ring and, therefore, reduce the thermal stresses. Accordingly, the turbine frame cooling system channels cooling air through the fairings to manage the thermal gradient of the struts and to maintain the temperature of the fluid lines below the coking temperature of the fluid within.

The use of bypass air simplifies the exterior and interior design of the engine and does not require any external pipes to move air from the compressor to the frame. By using bypass air, the hub design of the frame is simplified by not requiring features to meter the flow of air from inside the engine to the frame. The overall design is lighter and simpler than typical historic designs. Additionally, bypass air is typically cooler than convention air sources, such as the compressor, such that it cools more efficiently and also increased the operating efficiency of the engine by eliminating the need to capture compressor air from the primary flowpath.

Exemplary embodiments of turbine frame cooling systems are described above in detail. The turbine frame cooling system, and methods of operating such systems and devices are not limited to the specific embodiments described herein, but rather, components of systems and/or steps of the methods may be utilized independently and separately from other components and/or steps described herein. For example, the cooling system may also be used in combination with other systems requiring cooling, such as compressor frames, and are not limited to practice with only the turbine frames as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine frame cooling system for use with a gas turbine engine, said turbine frame cooling system comprising:
    an outer ring defining a cavity;
    a hub positioned radially inward of said outer ring;
    a plurality of circumferentially-spaced first fairings coupled between said outer ring and said hub;
    a plurality of circumferentially-spaced second fairings coupled between said outer ring and said hub, wherein said pluralities of first and second fairings are alternatingly positioned about said hub;
    a plurality of circumferentially-spaced air scoops coupled to said outer ring, wherein said plurality of air scoops extend into a bypass stream and are configured to channel a bypass air cooling flow into the cavity; and
    further comprising a plurality of independent cooling circuits, wherein each cooling circuit comprises:
    an air scoop of said plurality of air scoops;
    a first fairing of said plurality of first fairings; and
    a second fairing of said plurality of second fairings, wherein said first fairing is positioned adjacent said second fairing.

2. The turbine frame cooling system in accordance with claim 1, wherein each cooling circuit of said plurality of cooling circuits comprises a seal coupled within the cavity and configured to define a plurality of independent circuit cavities within said outer ring, wherein each circuit cavity corresponds to a cooling circuit of said plurality of cooling circuits.

3. The turbine frame cooling system in accordance with claim 2, wherein each seal is positioned at a circumferentially downstream end of each cooling circuit.

4. The turbine frame cooling system in accordance with claim 1, wherein each air scoop is configured to channel a first portion of the cooling flow radially through said first fairing and a second portion of the cooling flow through said second fairing.

5. The turbine frame cooling system in accordance with claim 4, wherein the first portion of cooling air is at a first temperature and the second portion of cooling air is at a second temperature greater than the first temperature.

6. The turbine frame cooling system in accordance with claim 1, further comprising a plurality of struts coupled between said hub and said outer ring, wherein each strut is positioned within a corresponding second fairing of said plurality of second fairings.

7. The turbine frame cooling system in accordance with claim 1, further comprising a plurality of groups of fluid lines coupled between said hub and said outer ring, wherein each group of fluid lines is positioned within a corresponding first fairing of said plurality of first fairings.

8. The turbine frame cooling system in accordance with claim 1, further comprising a control system configured to control the cooling airflow through said plurality of air scoops.

9. The turbine frame cooling system in accordance with claim 8, wherein said control system comprises:
    at least one temperature sensor coupled to at least one of said first fairing, said second fairing, and said outer ring;
    at least one valve coupled to each air scoop of said plurality of air scoops, wherein said at least one valve controls entry of the cooling air into said air scoop; and
    a controller operatively coupled to said at least one sensor and said at least one valve, wherein said controller is configured to open said at least one valve upon receiving a signal from said at least one sensor representative of a predetermined temperature.

10. The turbine frame cooling system in accordance with claim 1, further comprising a plurality of circumferentially-spaced seals coupled within the cavity defined in said outer ring, wherein said plurality of seals are configured to limit the circumferential flow of the cooling air within the cavity.

11. A method of cooling a turbine frame of a gas turbine engine, said method comprising:
    channeling a cooling flow from a bypass duct through a plurality of air scoops coupled to an outer ring of a frame, wherein the plurality of scoops extend into the bypass duct;
    channeling a first portion of the cooling flow through a plurality of first fairings, wherein the plurality of first fairings are coupled between the outer ring and an inner hub;
    channeling a second portion of the cooling flow through a plurality of second fairings, wherein the plurality of second fairings are coupled between the outer ring and the inner hub and are alternatingly positioned with the plurality of first fairings; and further comprising coupling a plurality of seals with the outer ring to define a plurality of cooling circuits therein.

12. The method according to claim 11, wherein channeling the first portion of cooling flow comprises channeling the first portion of cooling flow along a plurality of fluid lines extending between the outer ring and the hub.

13. The method according to claim 12, wherein channeling the second portion of cooling flow comprises channeling the second portion of cooling flow along a plurality of struts extending between the outer ring and the hub.

14. The method according to claim 13, wherein channeling the first portion of cooling flow along a plurality of fluid lines comprises channeling the first portion of cooling flow along a plurality of fluid lines at a first temperature, and wherein channeling the second portion of cooling flow along a plurality of struts comprises channeling the second portion of cooling flow along a plurality of struts at a second temperature that is greater than the first temperature.

15. The method according to claim 11, wherein each cooling circuit includes:
   an air scoop of the plurality of air scoops;
   a first fairing of the plurality of first fairings; and
   a second fairing of the plurality of second fairings, wherein the first fairing is positioned adjacent the second fairing.

16. The method according to claim 15, further comprising channeling the cooling airflow through each cooling circuit such that the first portion of cooling flow in the circuit is channeled through the first fairing of the circuit and the second portion of cooling flow in the circuit is channeled through the second fairing of the circuit.

17. The method according to claim 11, further comprising controlling the cooling flow through the plurality of air scoops with a control system.

18. The method according to claim 17, wherein controlling the cooling flow comprises:
   measuring, using a sensor, a temperature of at least one of the first fairing, the second fairing, and the outer ring;
   operating, with a controller coupled to the sensor, a plurality of valves coupled to a corresponding air scoop of the plurality of air scoops based on the measured temperature.

* * * * *